United States Patent
Liddle et al.

(10) Patent No.: US 9,854,788 B2
(45) Date of Patent: Jan. 2, 2018

(54) CONDENSED WATER SHEDDING BEEHIVE

(71) Applicants: Kendal Liddle, Salt Lake City, UT (US); John Guynn, Salt Lake City, UT (US)

(72) Inventors: Kendal Liddle, Salt Lake City, UT (US); John Guynn, Salt Lake City, UT (US)

(*) Notice: Subject to any disclaimer, the term of this patent is extended or adjusted under 35 U.S.C. 154(b) by 0 days.

(21) Appl. No.: 14/824,403

(22) Filed: Aug. 12, 2015

(65) Prior Publication Data
US 2016/0044898 A1 Feb. 18, 2016

Related U.S. Application Data

(60) Provisional application No. 62/038,117, filed on Aug. 15, 2014.

(51) Int. Cl.
*A01K 47/06* (2006.01)

(52) U.S. Cl.
CPC .................................. *A01K 47/06* (2013.01)

(58) Field of Classification Search
CPC ........ A01K 1/0058; A01K 47/00; A01K 47/06
USPC ................. 449/3, 13–15, 29, 46; 454/365–67
See application file for complete search history.

(56) References Cited

U.S. PATENT DOCUMENTS

| | | | |
|---|---|---|---|
| 207,731 A * | 9/1878 | Gale | A01K 47/06 449/13 |
| 251,157 A * | 12/1881 | Barnhart | A01K 47/06 449/14 |
| 1,441,524 A * | 1/1923 | Platten | A01K 47/00 449/13 |
| 2,498,880 A * | 2/1950 | Diehnelt | A01K 47/06 449/14 |
| 2,530,801 A * | 11/1950 | Babcock, Jr. | A01K 47/06 126/275 R |
| 2,584,304 A * | 2/1952 | Taylor | A01K 51/00 449/14 |
| 2,584,305 A | 2/1952 | Taylor | |
| 2,618,791 A * | 11/1952 | Roselieb | A01K 47/06 449/14 |
| 2,709,820 A * | 6/1955 | Wahl | A01K 47/00 449/14 |
| 4,443,904 A | 4/1984 | van Muyden | |
| 5,095,810 A * | 3/1992 | Robinson | F24F 7/02 454/365 |
| 2011/0263182 A1 | 10/2011 | Custer et al. | |
| 2013/0074428 A1 * | 3/2013 | Allen | E04D 13/17 52/173.3 |

FOREIGN PATENT DOCUMENTS

FR 2682260 A1 * 4/1993 ............ A01K 47/06

OTHER PUBLICATIONS

English-language translation of FR 2682260.*

* cited by examiner

*Primary Examiner* — Lisa L Tsang
(74) *Attorney, Agent, or Firm* — Workman Nydegger

(57) ABSTRACT

An improved beehive for shedding moisture and protecting bees includes a condensation promoting surface that provides for controlled condensation of water vapor to form liquid water and transport of the condensed liquid water out of the beehive.

20 Claims, 6 Drawing Sheets

CONDENSED WATER SHEDDING BEEHIVE

CROSS-REFERENCE TO RELATED APPLICATIONS

This Application claims the benefit of U.S. Provisional Patent Application No. 62/038,117, filed Aug. 15, 2015, the disclosure of which is incorporated herein in its entirety.

BACKGROUND

I. The Field of the Invention

The invention is in the field of beehives and beekeeping and includes apparatus and methods for reducing moisture within a beehive or other containers for living organisms.

II. The Related Technology

Honeybees are social bees of the genus *Apis*. They are commonly kept in a semi-domesticated form for production of honey and pollination of crops. Domesticated honeybee colonies are typically housed in an enclosed structure commonly called a "beehive."

As illustrated in FIG. 1, a conventional beehive 100 is typically composed of three main parts: (1) a "bottom board" 102 which forms the floor of the beehive; (2) the "hive body" 104 comprised of one or more bottomless boxes stacked on the bottom board and that provide a hive interior in which bees can live; and (3) the "cover" 106 which acts as a lid and roof to the system.

The environment inside of a beehive is typically warm and humid from the respiration of the honeybee colony and the evaporation of nectar in the production of honey. Beehives are typically vented to prevent excessive buildup of heat and humidity during warmer seasons. A passive updraft of ventilation air enters a vent near the bottom of the hive, passes upward through the interior of the hive body, and exits through one or more vents near the top of the beehive (e.g., through or near the cover).

During cold seasons, particularly in temperate climates, bees typically become dormant and form a cluster 110 to share and conserve heat. To maintain adequate warmth within the hive and prevent excessive loss of heat through the cover, a porous insulation barrier (not shown) can be placed near the top of the hive body above the cluster 110 and below the cover 106. The insulation barrier retains within the hive sufficient heat generated by the bees to prevent freezing and death. In addition, the porous insulation barrier can permit warm humid air 112 in the hive to rise and exit the hive through one or more vents (not shown). However, when the dew point of humid air 112 is equal to or greater than the temperature of the underside of cover 106 or walls of hive body 104, water vapor can condense, forming condensed water droplets 114, which can drip onto the bee cluster 110, causing sickness or death. Condensed water on the inner walls of hive body 104 can also cause mold formation.

In some cases a sponge-like body having a high affinity for moisture can be used as the porous insulation barrier. Examples include sawdust and diapers. Gel substances contained in diapers are capable of absorbing and holding large amounts of water, such as condensed water 114 dripping from the inner surface of cover 106. However, once the water absorbing substance is saturated it is no longer able to absorb more condensed water 114, and the risk of such water 114 dripping on the bee cluster 110 greatly increases. Water absorbing substances can be replaced periodically to maintain their water absorbing ability and prevent dripping onto the cluster.

Alternatively, a ventilation fan can be provided, which can be periodically activated to further vent the hive and prevent excess buildup of humidity and condensation. As long as a proper balance of insulation and ventilation is maintained, the beehive can stay sufficiently warm and dry through cold periods to prevent mold growth and/or dripping of water onto the bee cluster.

SUMMARY

Disclosed herein is an improved beehive that more effectively prevent water vapor from condensing and wetting a honey bee cluster within the hive body and/or causing mold growth within the hive. Counterintuitively, rather than preventing water vapor from condensing, the improved beehive is designed to promote water vapor condensation, but in a controlled way so as to form liquid water that can be easily removed from the hive and/or channeled or collected in way that prevents undesired wetting of bees in the hive and/or mold growth. The disclosed design can be used for other animal enclosures in addition to beehives.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments which are illustrated in the drawings. It is appreciated that these drawings show only illustrated embodiments of the invention and are therefore not to be considered limiting of its scope. The invention will be described and explained with additional specificity and detail through the use of the accompanying drawings, in which.

DETAILED DESCRIPTION

Figure 1:
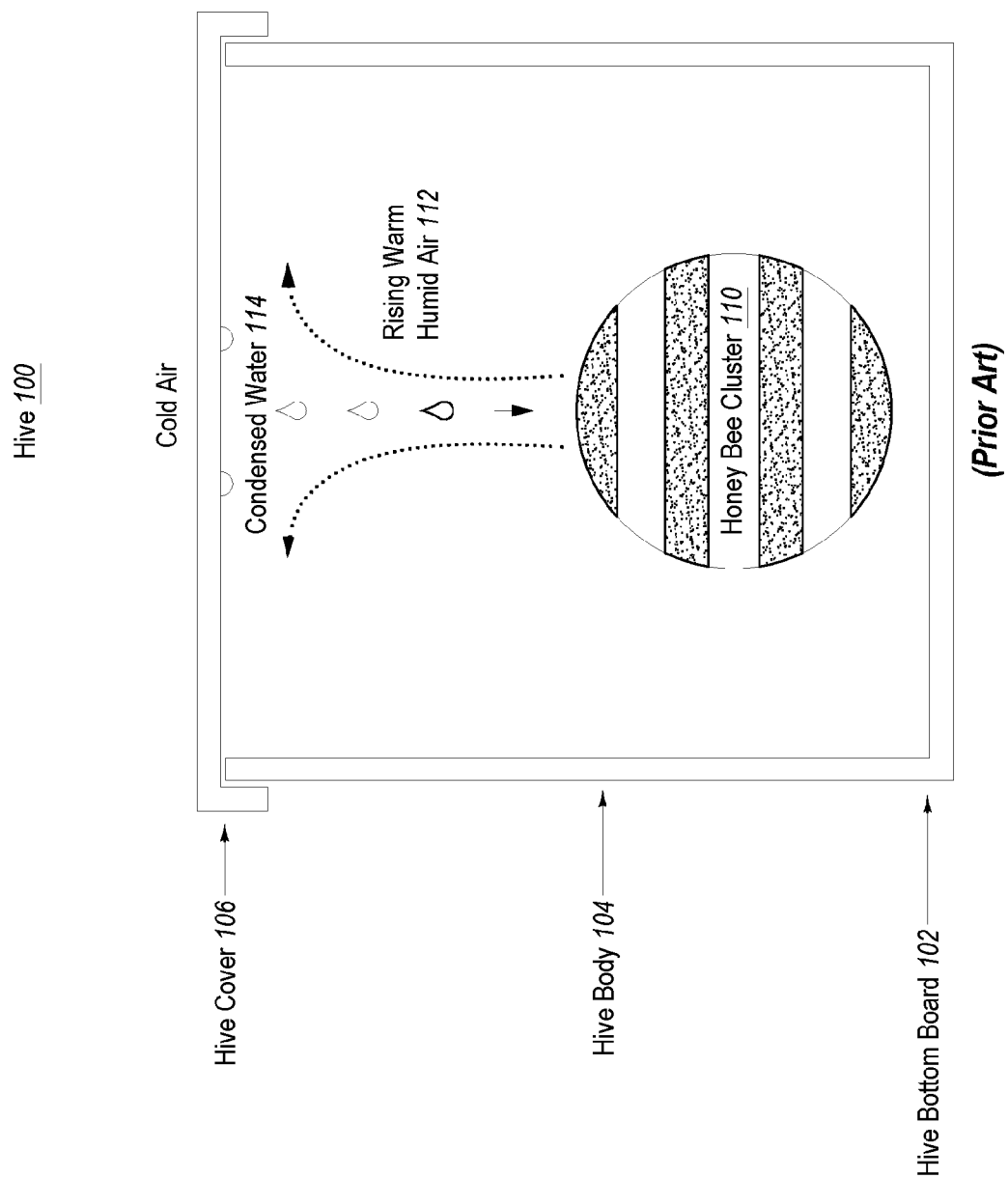
FIG. 1 schematically illustrates a conventional vented beehive in which water droplets can form on the cold underside of the cover and drip onto a bee cluster.

Disclosed herein are improved beehives and other animal enclosures designed to control water vapor condensation in order to prevent or minimize wetting of bees or other animals in the hive or enclosure. The improved apparatus may also help control or prevent mold growth.

According to some embodiments, the improved beehives or other animal enclosures are designed so as to promote water vapor condensation at one or more dedicated condensation locations and channel, drain or convey the condensed liquid water outside the hive body and/or to a collection zone within the hive body or other enclosure. Advantageously, one or more condensation surfaces that promote localized condensation are positioned in fluid communication with humid air within the hive body or other enclosure. In some cases, the condensation surface can be the same material from which the hive, or portion thereof, is built (e.g., wood). In other cases, it can be a sheet or other structure positioned within a controlled condensation zone or area (e.g., metal cladding on an interior surface of the hive).

According to some embodiments, the one or more condensation surfaces are in fluid communication with means for channeling, draining or conveying the condensed water outside the hive, such as one or more of a sloped surface, tubing, channel, conduit, ridges, troughs, capillary flow material, or any other mechanical or physical structure capable of channeling, draining or conveying condensed water to a location outside the hive body.

Promoting water condensation within one or more dedicated condensation zones or areas dehumidifies, or reduces humidity of, the air within the hive body ("hive air"). This reduces the dew point of the hive air so that it is generally lower than the temperature of surfaces within the hive body that are designed to stay dry. This minimizes or prevents formation of water droplets on interior surfaces of the beehive except for the condensation zone(s) or surface(s), which might otherwise promote mold growth on such surfaces and/or drop onto the bee cluster. Thus, providing or promoting condensation in one or more controlled locations reduces humidity within the hive and prevents or eliminates water condensation in unwanted locations within the hive body.

According to some embodiments, one or more condensation surfaces are configured to channel water droplets to one or more drainage holes or vents by one or more of capillary action, surface tension, or gravity. The condensation surface(s) may be inward facing and form an inner surface of the beehive cover, such as a cover that slopes downward from a peak toward one or more drainage locations. The condensation surface(s) may form part of an upwardly facing shield positioned between the cover and hive body. To the extent water droplets on an undersurface of the cover become large enough to fall from the cover, they can land on the shield surface, which can assist in channeling the condensed water by one or more of capillary action, surface tension, or gravity toward one or more drainage holes or vent, which can be the same or different drainage hole(s) which cooperate with the condensation surface.

One or more condensation surfaces and associated drainage tubes, holes, chains, capillary structures, or other drainage or transport means can be positioned within the hive body to dehumidify the air and reduce or prevent condensation of water on the hive body walls. One or more collection vessels formed of a more insulating outer wall material (plastic) may include a heat conducting inner surface material (metal) that cause water to preferentially condense in the collection vessel(s). The collection vessel(s) may have the capacity to hold all the water produced during cold periods. Alternatively, the collection vessel(s) may have a drainage hole, tube, pipe, chain or conduit that conveys the water to a location outside the hive and/or to a larger holding tank within or below the hive body.

At least a portion of an inner surface of the hive body wall can be lined with metal sheeting or other thermally conductive material to promote localized condensation in a controlled location in order to reduce or prevent condensation at other locations intended to stay dry. A catch lip may form a catch channel for collecting condensed water from the thermally conductive material and channeling it to a hole, tube or conduit as described elsewhere. Alternatively, the thermally conductive material can extend to a vent or drainage hole through or near the bottom board of the hive.

Figure 2:
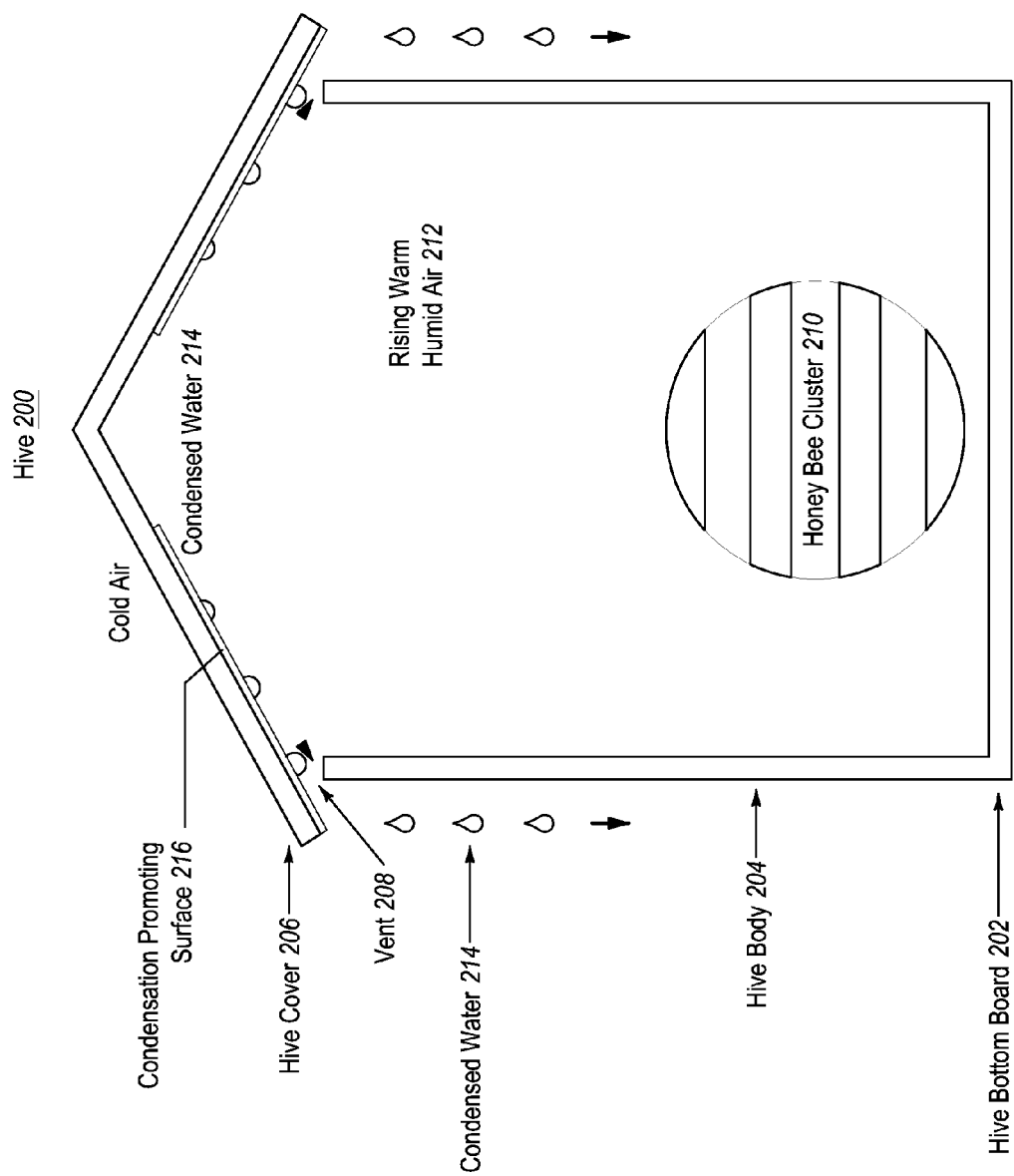
FIG. 2 schematically illustrates a first embodiment of a beehive configured to promote controlled condensation and drainage of water from the hive.

Attention is now turned to the illustrated examples shown in the drawings. FIG. 2 illustrates a beehive 200 configured to promote controlled water condensation and drainage of condensed water from the hive. The beehive can include a bottom board or surface 202, hive body 204 (which may include one or more layered boxes or partitions), a hive cover 206, and one or more drainage vents or holes 208 (e.g., near cover 206). A bee cluster 210 can form during periods of cold weather and produce warm humid air 212, which rises toward hive cover 206 and forms condensed water 214 when the dew point of humid air 212 exceeds the temperature of the inner surface of cover 206.

In some embodiments, cover 206 may further include a condensation promoting surface 216 positioned on the underside of cover 206, which helps to promote condensation of water vapor and formation of water droplets 214 and then transports, conveys, or drains the condensed water droplets 214 out of the hive through drainage vents or holes 208. This may be accomplished, for example, via capillary action, surface tension, and/or gravitational pull of water on the interior surface of the cover outside of the hive (e.g., toward one or more drainage holes or conduits). An example of a condensation promoting surface 216 that promotes condensation and transport of water via capillary action, surface tension and/or gravitation pull is micro corrugated metal (e.g., steel, copper, tin, aluminum or other appropriate metal or thermally conductive material). In other cases, a bottom surface of a wooden cover itself can function as the condensation promoting surface. In many cases, the cover will function as the condensation surface because it will have the greatest temperature differential between the material making up its structure and the warm humid air 212 making contact with it (e.g., because heat rises it will be warmest when approaching the undersurface of the cover).

Figure 3:
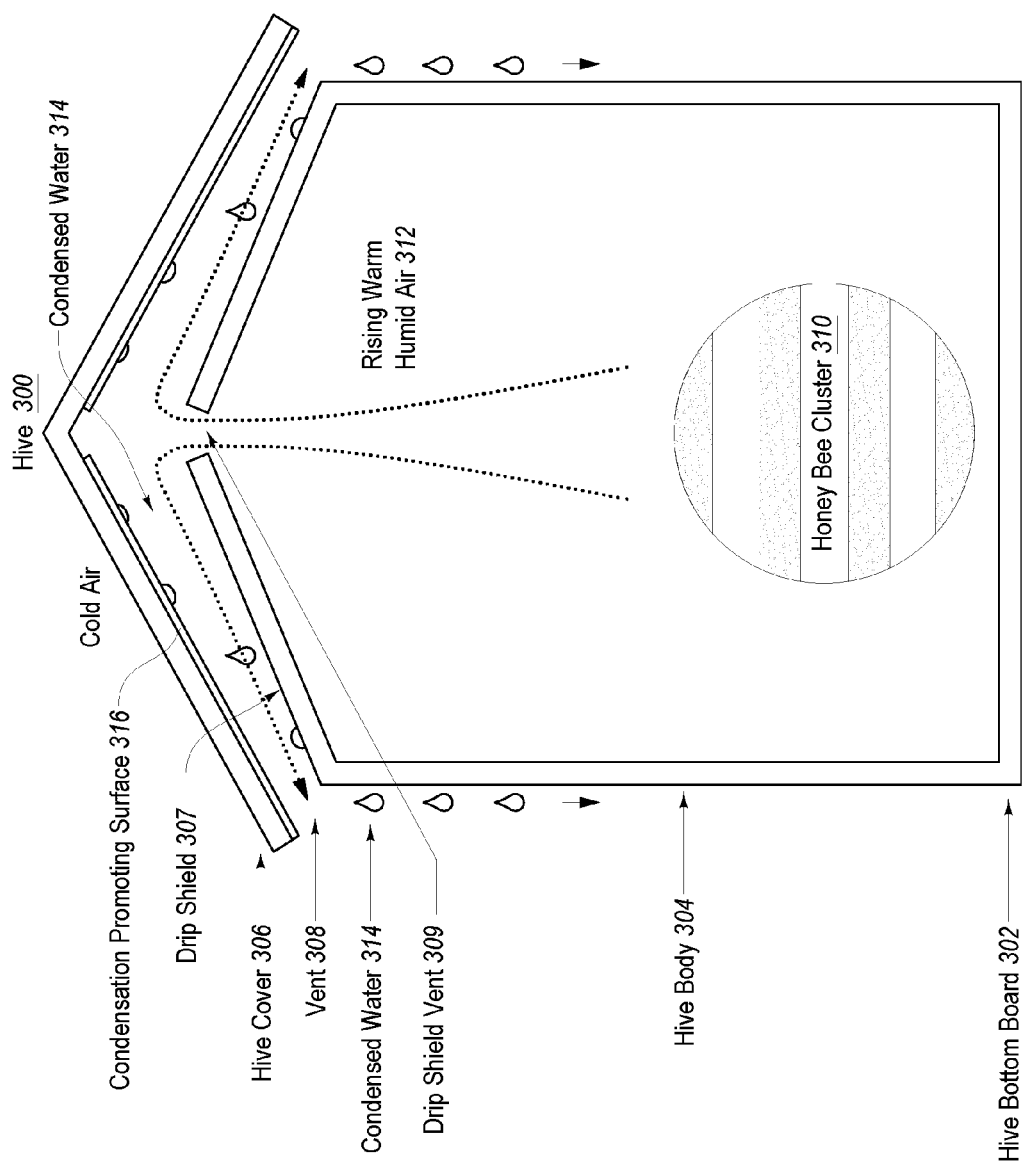
FIG. 3 schematically illustrates a second embodiment of a beehive configured to promote controlled condensation and drainage of water from the hive.

FIG. 3 illustrates a beehive 300 that includes a bottom board 302, hive body 304, hive cover 306, a hive shield 307, one or more drainage vents or holes 308 positioned between or in fluid communication with cover 306 and shield 307, and one or more humidity vents 309 through shield 307. A bee cluster 310 produces warm humid air 312, which rises and passes through humidity vent(s) 309, condenses on an inner surface of hive cover 306, and forms condensed water 314 when the dew point of humid air 312 exceeds the temperature of the inner surface of cover 306. Cover 306 may further include a condensation promoting surface 316, which promotes condensation of water vapor and formation of water droplets 314 and then transports, conveys, or drains the condensed water droplets 314 out of the hive through drainage vents or holes 308. The region between condensation promoting surface 316 and hive shield 307 is a condensation region. A porous screen (not shown) may be provided that permits air flow but prevents bees from entering the condensation region.

If the water droplets 314 grow large enough to fall from cover 306 and/or condensation promoting surface 316 before reaching drainage holes 308, shield 307 is able to catch them and continue conveying them to drainage holes 308. Water droplets 314 that fall onto shield 307 can be conducted to the outside of the hive by, e.g., gravitational pull toward one or more holes or conduits 308. In this way, shield 307 advantageously separates condensation promoting surface 316 or cover 306 from hive body 304 to further prevent water from dripping onto cluster 310. According to one embodiment, the shield/catch 307 can include a moisture resistant material to prevent formation of mold or seepage of moisture into the material (e.g., wood). Examples of moisture resistant materials include metal sheeting, durable coatings, or polymer sheets, laminates, and the like.

Figure 4:
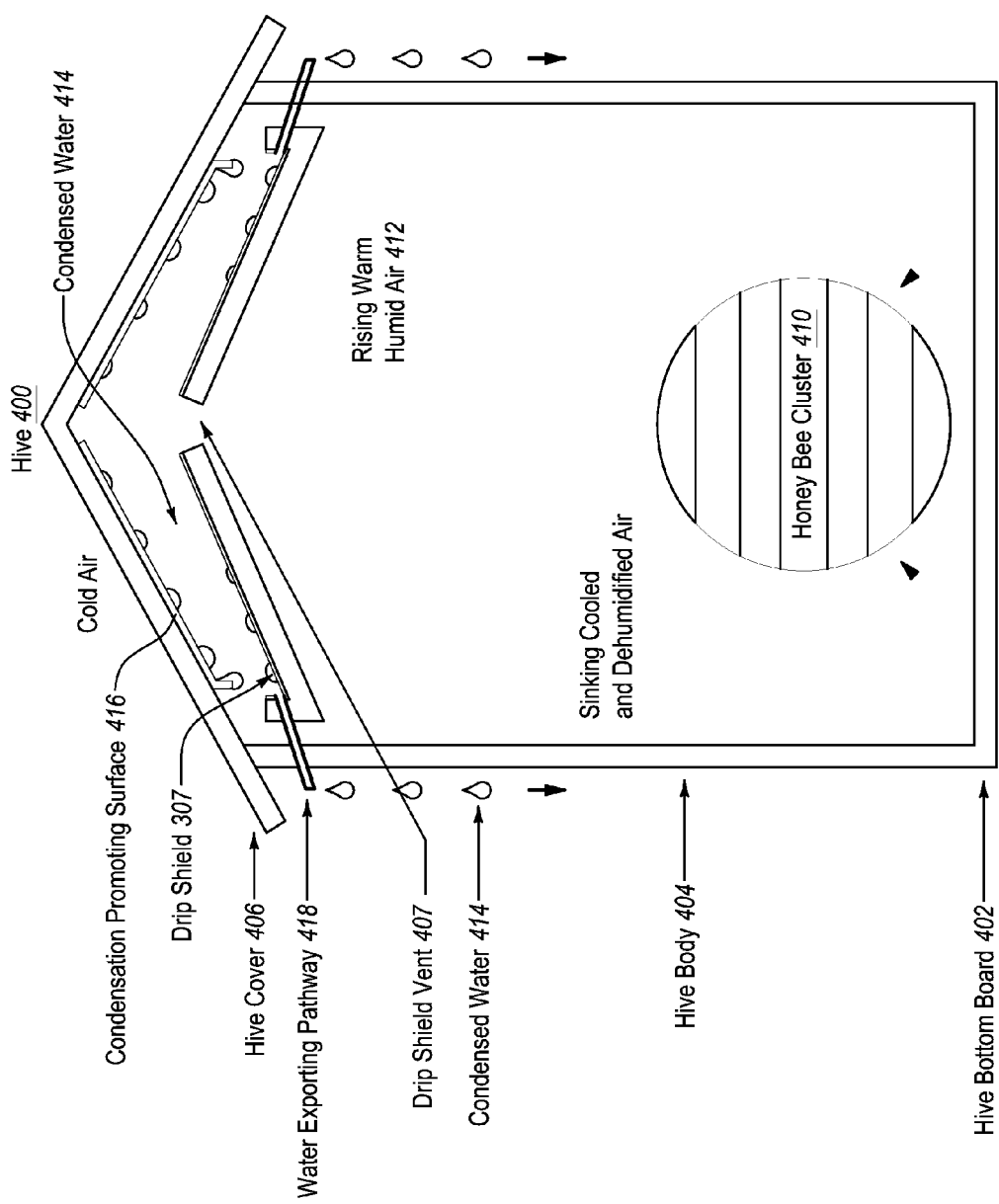
FIG. 4 schematically illustrates a third embodiment of a beehive configured to promote controlled condensation and drainage of water from the hive.

FIG. 4 illustrates a beehive 400 similar to beehive 300, wherein the moisture resistant material is metal or other thermally conductive material, which may provide a secondary condensation promoting surface 416 in addition to or instead of the condensation promoting surface on an underside of cover 406. In fact, condensation promoting surface 416 on shield 407 may itself provide the primary condensation surface rather than an underside of cover 406, particularly when shield 407 includes a thermally conductive cladding on the its surface (e.g., metal) and cover 406 comprises wood without thermally conductive cladding. A water exporting pathway or channel 418 can divert water outside the hive while a gap between shield 407 and hive body 404 permits downward flow of cooled, dried air back toward the bottom of the hive to promote a convection flow through the hive as illustrated.

In some embodiments it may be desirable for shield 307/407 to be sufficiently insulating so that moisture does not condense on its undersurface, which might result in condensation of water droplets, which can fall into hive body 304/404 and onto a bee cluster 310/410. Shield 307/407 may comprise wood, which provides good insulation, and a water resistant surface as mentioned above. The entire shield layer may alternatively comprise a polymer material that is both insulative and water proof. However configured, the shield layer advantageously assists in conveying water droplets that may form or fall onto its upper surface to a location outside the hive body.

In view of the foregoing, one or more condensation surfaces can be provided above the hive body on the cover (or portion thereof), the hive cover in combination with a drip shield beneath it to catch water drips, with the drip shield optionally providing a secondary condensation surface, or in which the drip shield surface itself provides the primary or sole condensation surface.

Alternatively, one or more condensation surfaces can be provided within the hive body itself. Advantageously, such condensation surfaces are designed so as to not promote mold forming condensation or dripping of water onto the bee cluster. Instead, they can act as interior dehumidifying surfaces or regions to lower the dew point of the ambient air within the beehive and reduce or prevent condensation on other interior surfaces of the hive body.

Figure 5:
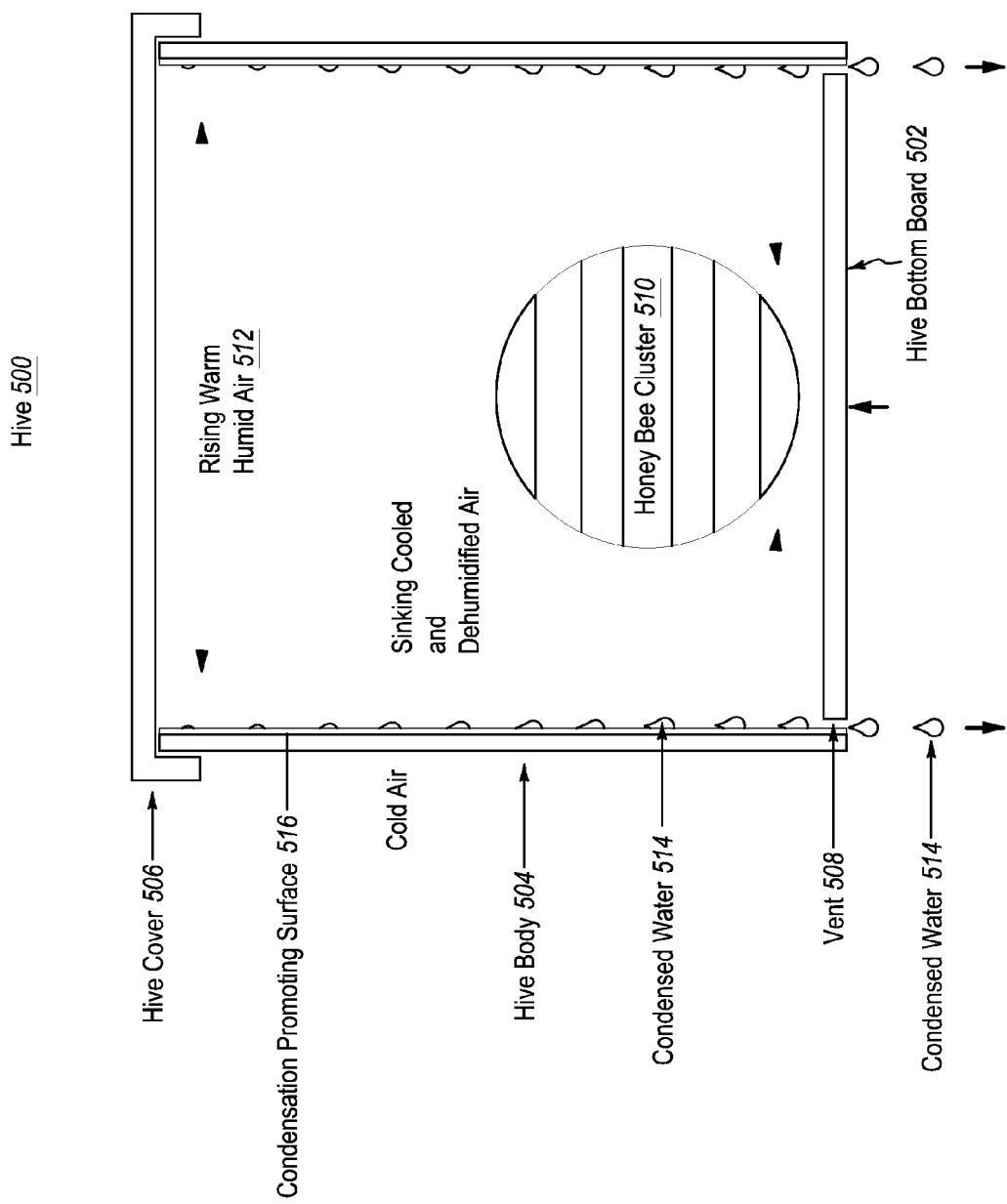
FIG. 5 schematically illustrates a fourth embodiment of a beehive configured to promote controlled condensation and drainage of water from the hive.

FIG. 5 illustrates a hive 500 with one or more condensation promoting surfaces 516 on an inner wall of hive body 504. The condensation promoting surface(s) 516 can be positioned anywhere, such as on the hive body wall. In the illustrated example, they are positioned along an entire length of a wall, from a location near the top of the hive body 504 where the air 512 tends to be warmer and more moist (i.e., because warm humid air emitted by the bee cluster tends to rise) and extending downward to the hive floor or bottom board 502. The condensation promoting surface(s) 516 may comprise a thermally conductive material, such as metal sheeting or wire mesh (e.g., steel, stainless steel, copper, tin, aluminum, and the like). If configured properly, water droplets 514 can simply run down the condensation promoting surface 614 and drain toward the bottom 512 of the hive 500. According to one embodiment, the condensation promoting surface 516 (e.g., metal sheeting or mesh) can extend below the hive floor, through one or more drainage holes 508 and provide a drip edge.

Figure 6:
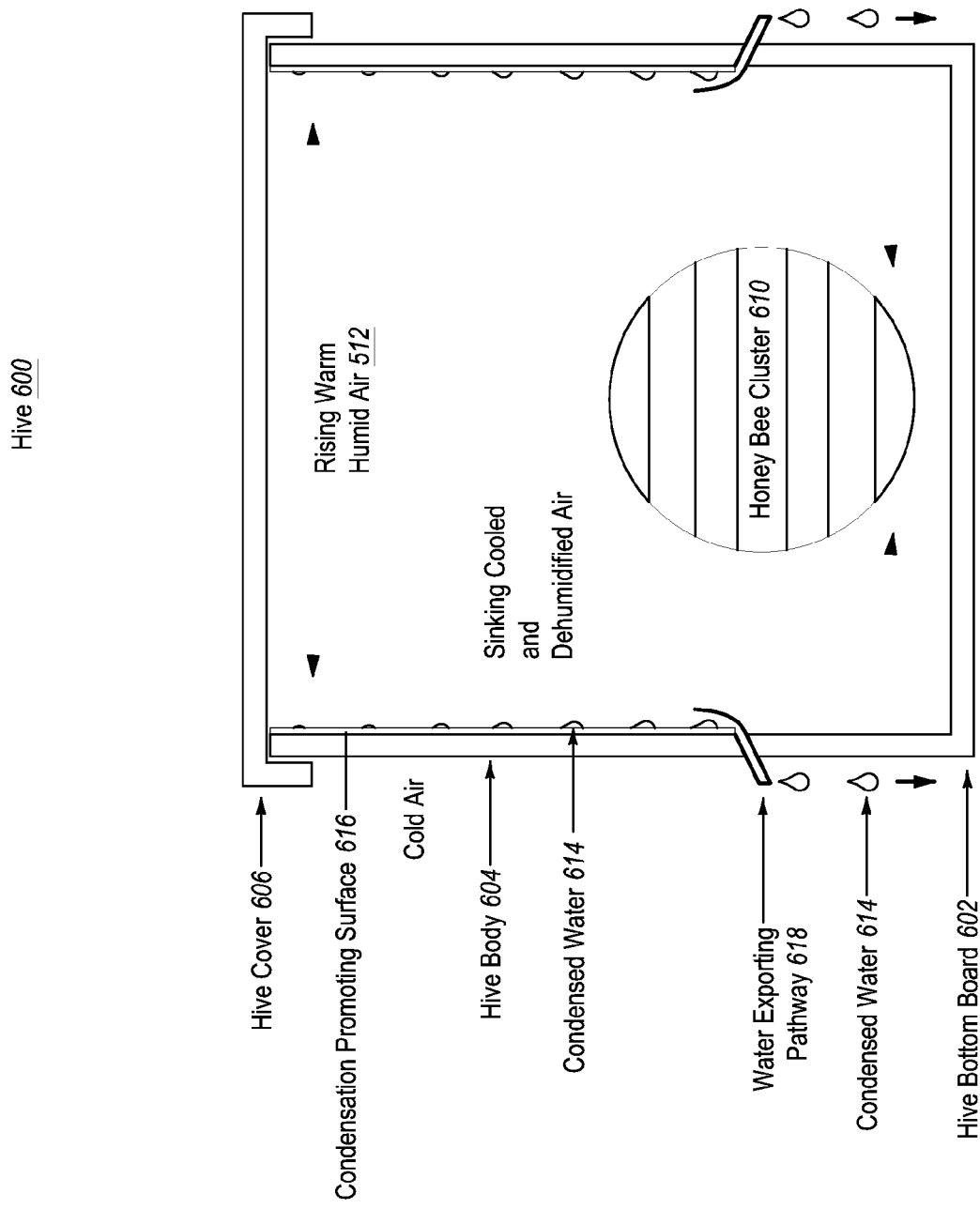
FIG. 6 schematically illustrates a fifth embodiment of a beehive configured to promote controlled condensation and drainage of water from the hive.

Alternatively, as illustrated in FIG. 6, beehive 600 with features similar to beehive 500 may include a small protruding wall or dam can catch and channel condensed water 614 dripping down a vertical condensation promoting surface 614 toward a drainage hole, pipe, conduit or tubing 618.

As an alternative to the foregoing embodiments, a hive with one or more condensation collection vessels, cups, or basins can be provided. The condensation collection vessels, cups, or basins can be positioned anywhere in the hive body. For example, they can be positioned near the top of the hive body where the air tends to be warmer and more moist (i.e., because warm humid air emitted by the bee cluster tends to rise). They can be positioned on or near a side wall. The vessel, cup or basin may include an exterior surface formed from a material with relatively low thermal conductivity and/or heat capacity, such as a polymer material. The interior surface of the collection vessel(s), cup(s), or basin(s) may be lined with a highly thermally conductive material, such as metal (e.g., sheet metal), in order to promote condensation within the interior of the condensation cup or basin. The collection vessel, cup, or basin may be in fluid communication with a hole through the side wall to permit water to flow out the hole and out the hive. An optional drip edge may assist in causing water to drip a distance from the outer hive wall to prevent water from running down the wall.

The examples above are merely illustrative. Any structure that is able to promote controlled condensation of water vapor in order to prevent water droplets from falling back into the hive body and onto a bee cluster and conveyance of moisture to a location outside the hive body is within the scope of the disclosure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An animal enclosure, comprising:
   a hollow body comprising:
   a plurality of opposing outer sidewalls, each having an upper end and a lower end;
   a bottom surface extending between the lower ends of the outer sidewalls;
   an interior region between the outer sidewalls and above the bottom surface for containing an animal;
   a cover positioned above the upper ends of the outer sidewalls and extending over and vertically above the interior region of the hollow body;
   a catch surface comprising a plurality of substantially planar boards of non-porous material each positioned at an angle relative to horizontal between the cover and the interior region, the catch surface extending substantially continuously across an entirety of the interior region and between the outer sidewalls in order to stop condensed water from dripping into the interior region, the catch surface sloping downwardly towards at least one vent or drainage opening to assist removal of condensed water to outside the hollow body;
   at least one condensation promoting surface comprising a thermally conductive material between the cover and the catch surface, wherein the at least one condensation promoting surface is configured to promote condensation of water vapor emitted from the interior region of the hollow body; and the at least one vent or drainage opening being positioned between the cover and the catch surface above the upper end of at least one of the outer sidewalls and cooperating with the at least one condensation promoting surface and the catch surface to conduct condensed water outside the hollow body.

2. The animal enclosure of claim 1, wherein the at least one condensation promoting surface is configured to conduct condensed water outside the hollow body.

3. The animal enclosure of claim 1, wherein the at least one condensation promoting surface is downward facing.

4. The animal enclosure of claim 1, wherein the at least one condensation promoting surface is sloped toward the at least one vent or drainage opening.

5. The animal enclosure of claim 1, wherein the at least one vent or drainage opening is configured so that condensed water drips down outside the hollow body.

6. The animal enclosure of claim 1, wherein the at least one condensation promoting surface is adjacent to or formed on a lower surface of the cover.

7. The animal enclosure of claim 1, wherein the condensation promoting surface is adjacent to or formed on an upper surface of the catch surface.

8. The animal enclosure of claim 1, wherein one of the planar boards of the catch surface is downwardly sloped in a first direction toward the at least one vent or drainage opening and at least one other of the planar boards of the catch surface is downwardly sloped in a second direction different than the first direction and toward at least one other vent or drainage opening to assist flow of condensed water to outside the hollow body.

9. The animal enclosure of claim 1, the catch surface including at least one humidity vent disposed vertically above the interior region and configured for venting humid air from the interior region toward the at least one condensation promoting surface.

10. The animal enclosure of claim 1, wherein the animal enclosure is a beehive.

11. A beehive enclosure, comprising:
a hive body defined by a plurality of opposing outer sidewalls, a bottom surface extending between lower ends of the outer sidewalls, and an interior region between the outer sidewalls and above the bottom surface for containing bees and including an upper space between upper ends of the outer sidewalls;
a wooden hive cover positioned above the upper ends of the outer sidewalls and extending over and vertically above the interior region of the hive body;
a thermally conductive layer comprising a thermally conductive material attached to a lower surface of the wooden hive cover that provides a condensation promoting surface, wherein the condensation promoting surface faces toward and is in fluid communication with the interior region of the hive body and promotes condensation of water vapor emitted from the interior region of the hive body;
a wooden drip shield positioned beneath the wooden hive cover and the thermally conductive layer and above the interior region, the wooden drip shield extending substantially across an entirety of the interior region and between the outer sidewalls in order to stop condensed water from dripping into the interior region, the wooden drip shield positioned at an inclined angle relative to horizontal and sloping downwardly towards at least one or more water drainage holes or channels to assist removal of condensed water to outside the hive body, the wooden drip shield being mostly parallel to at least a portion of the cover; and
wherein the one or more water drainage holes or channels are adjacent to one or more corresponding outer sidewalls and the wooden drip shield and configured for removing condensed water that forms on the condensation promoting surface, wherein the condensation promoting surface is downwardly sloped toward the one or more water drainage holes or channels.

12. The beehive enclosure of claim 11, wherein the thermally conductive layer comprises a material that protects the wooden hive cover from moisture.

13. The beehive enclosure of claim 11, wherein the thermally conductive material comprises metal.

14. The beehive enclosure of claim 11, wherein the condensation promoting surface comprises a material having grooves or micro corrugation, providing capillary action, or comprising wire mesh.

15. The beehive enclosure of claim 11, further comprising a drip edge on or adjacent to an exterior surface of the hive body.

16. The beehive enclosure of claim 11, wherein the wooden drip shield includes a first portion that is positioned at a first angle relative to horizontal to promote drainage of water toward a first one of the one or more water drainage holes or channels, and the wooden drip shield includes a second portion that is positioned at a second angle relative to horizontal different than the first angle to promote drainage of water toward a second one of the one or more water drainage holes or channels.

17. The beehive enclosure of claim 11, further comprising one or more humidity vents through the wooden drip shield and positioned vertically above the interior region that permit flow of humid air from the interior region of the hive body past the wooden drip shield and toward the condensation promoting surface.

18. The beehive enclosure of claim 11, further comprising a porous screen beneath the wooden drip shield and above the interior region that permits air flow but prevents bees from entering a condensation region beneath the hive cover and above the wooden drip shield.

19. A beehive enclosure, comprising:
a hollow hive body defined by:
a plurality of outer sidewalls, the plurality of outer sidewalls comprising at least a first outer sidewall and a second outer sidewall, wherein the second outer sidewall is opposite the first outer sidewall, and wherein each of the first outer sidewall and the second outer sidewall includes an upper end and a lower end;
a bottom surface extending between the lower end of the first outer sidewall and the lower end of the second outer sidewall;
a catch shield comprising a plurality of planar boards of collectively extending substantially across an entirety of an interior region of the beehive enclosure and between the first and second outer sidewalls at an inclined angle relative to horizontal, wherein the catch shield defines an aperture at a central region of the hollow body; and
wherein the interior region is between the catch shield and above the bottom surface for containing bees;
a cover positioned above the catch shield and extending over the hollow body, the cover comprising a condensation promoting surface comprising a thermally conductive material, wherein the condensation promoting surface is directed towards the catch shield, and wherein the condensation promoting surface is configured to promote condensation of water vapor emitted from the hollow body; and a vent or drainage opening positioned between the cover and the catch shield and above the upper end of the first outer sidewall or the second outer sidewall, the vent or drainage opening cooperating with the condensation promoting surface, and the catch shield being downwardly sloped toward the vent or drainage opening to conduct condensed water outside the hollow body.

20. The beehive enclosure of claim 19, wherein the catch shield is downwardly sloped to promote flow of condensed water toward the vent or drainage opening.

* * * * *